(12) United States Patent
Stellmacher et al.

(10) Patent No.: US 10,727,624 B2
(45) Date of Patent: Jul. 28, 2020

(54) PLUG COUPLING WITH STRAIN RELIEF FOR A CONNECTING CABLE

(71) Applicant: WABCO Europe BVBA, Brussels (BE)

(72) Inventors: Thomas Stellmacher, Stadthagen (DE); Ingo Brinkmeier, Hannover (DE); Ingo Jovers, Gehrden (DE); Johann Lucas, Sehnde (DE)

(73) Assignee: WABCO Europe BVBA, Brussels (BE)

(*) Notice: Subject to any disclaimer, the term of this patent is extended or adjusted under 35 U.S.C. 154(b) by 0 days.

(21) Appl. No.: 16/475,813

(22) PCT Filed: Feb. 7, 2018

(86) PCT No.: PCT/EP2018/052995
§ 371 (c)(1),
(2) Date: Jul. 3, 2019

(87) PCT Pub. No.: WO2018/153661
PCT Pub. Date: Aug. 30, 2018

(65) Prior Publication Data
US 2019/0356088 A1 Nov. 21, 2019

(30) Foreign Application Priority Data
Feb. 22, 2017 (DE) .................. 10 2017 001 931

(51) Int. Cl.
*H01R 13/58* (2006.01)
*H02G 15/007* (2006.01)
(52) U.S. Cl.
CPC ....... *H01R 13/5816* (2013.01); *H02G 15/007* (2013.01)
(58) Field of Classification Search
CPC .......................... H01R 13/5816; H02G 15/007
See application file for complete search history.

(56) References Cited

U.S. PATENT DOCUMENTS

| 2004/0038588 A1 | 2/2004 | Bernardi et al. |
| 2011/0315442 A1* | 12/2011 | Nolting ............... H01R 13/506 174/652 |
| 2019/0356088 A1* | 11/2019 | Stellmacher ....... H01R 13/5816 |

FOREIGN PATENT DOCUMENTS

| DE | 3018119 A1 | 11/1981 |
| DE | 3101558 A1 | 9/1982 |

(Continued)

OTHER PUBLICATIONS

European Patent Office, Rijswijk, Netherlands, International Search Report of International Application No. PCT/EP2018/052995, dated May 14, 2018, 2 pages.

*Primary Examiner* — Abdullah A Riyami
*Assistant Examiner* — Nader J Alhawamdeh
(74) *Attorney, Agent, or Firm* — Dickinson Wright PLLC

(57) ABSTRACT

A strain relief arrangement (4) for a connecting cable (2) has a threaded pin (12), clamping tongues (13), a union nut (3), an enlarged diameter (10, 11) on the threaded pin (12), an extension (15), and a passage bore (25) for the connecting cable (2). By screwing of the union nut (3) onto the threaded pin (12), the clamping tongues (13) move inward and press against the connecting cable (2) for strain relief. The extension (15) is non-round, and an opening (6) of a carrier element (5) is complementary (7, 8) to the extension (15). An enlarged region (16) of the extension (15) has a circumferential groove (20) adjacent to the enlarged diameter (10, 11). The extension (15) can be introduced into the opening (6) of the carrier element (5) and can be fastened by rotation in the opening (6).

11 Claims, 3 Drawing Sheets

(56) References Cited

FOREIGN PATENT DOCUMENTS

| DE | 3211511 A1 | | 10/1983 | |
|---|---|---|---|---|
| DE | 3604214 A1 | | 8/1987 | |
| DE | 102008057473 A1 | * | 5/2010 | ............... H02G 3/22 |
| DE | 102008057473 A1 | | 5/2010 | |
| FR | 2524217 A1 | | 9/1983 | |
| GB | 2091498 A | * | 7/1982 | ................ F16L 5/06 |
| GB | 2091498 A | | 7/1982 | |

* cited by examiner

PLUG COUPLING WITH STRAIN RELIEF FOR A CONNECTING CABLE

TECHNICAL FIELD

The invention relates to a strain relief arrangement for a connecting cable, having a threaded pin, clamping tongues at the free end of the threaded pin, a union nut for screwing onto the threaded pin, an enlarged diameter on the threaded pin for bearing against a surface of a carrier element, and an extension for introducing and fastening in an opening of the carrier element, wherein the strain relief arrangement has a passage bore for the passage of the connecting cable, and in which, by screwing of the union nut onto the threaded pin, the clamping tongues are movable radially inward and are pressable against the outer circumference of the connecting cable in order to bring about the strain relief of the connecting cable.

BACKGROUND

A plug coupling of this type is known from DE 36 04 214 A1. The axial extension for introducing and fastening in an opening of the carrier element is likewise designed as a threaded pin, and therefore the plug coupling has to be fastened to the carrier element by a further union nut from the rear side. This type of fastening is awkward, in particular if access to the rear side of the carrier element is difficult.

SUMMARY

Against this background, it was the object of the invention to propose an improved strain relief arrangement which can be fastened releasably to a carrier element in a simple manner without having to use additional components to be mounted separately. Such a strain relief arrangement is intended to be able to serve for the releasable coupling of an operating unit to an electronically controlled air suspension system by means of a connecting cable.

This object is achieved with a strain relief arrangement for a connecting cable, having a threaded pin, clamping tongues at the free end of the threaded pin, a union nut for screwing onto the threaded pin, an enlarged diameter on the threaded pin for bearing against a surface of a carrier element, and an extension for introducing and fastening in an opening of the carrier element, wherein the strain relief arrangement has a passage bore for the passage of the connecting cable, and in which, by screwing of the union nut onto the threaded pin, the clamping tongues are movable radially inward and are pressable against the outer circumference of the connecting cable in order to bring about the strain relief of the connecting cable.

This strain relief arrangement is characterized in that the extension is of non-round or polygonal design with radially larger and smaller regions, in that the opening of the carrier element is designed to be geometrically complementary to the non-round or polygonal extension, in that the at least one radially enlarged region of the non-round or polygonal extension is at least partially provided with at least one circumferential groove adjacent to the enlarged diameter, in that the axial width of the circumferential groove corresponds to the thickness of the carrier element in the region of the opening, and in that the radial depth of the circumferential groove corresponds to the radial dimension of the at least one radially smaller region of the extension in such a manner that the extension can be introduced into the geometrically complementary opening of the carrier element and can be fastened to the carrier element by rotation by preferably at most 180° in the complementary opening.

It is therefore possible to introduce the plug coupling having strain relief with a connecting cable fastened thereto from the front side of the carrier element into the opening and to fasten same to the carrier element by means of a simple, limited rotation in the geometrically complementary opening without fastening screws or union nuts to be screwed onto the plug coupling from the rear side of the carrier element having to be provided.

In this connection, it is preferably provided that the radially enlarged region of the extension consists of two radially opposite circular portions with the common center point on the longitudinal axis of the bore for the connecting cable, that the radially smaller region of the extension consists of parallel, radially opposite flattened portions, and that a respective circumferential groove is formed in each radially enlarged region. An opening shaped in such a manner can be produced in a simple manner in the carrier element, for example by punching out if the carrier element is composed of sheet metal, or can be produced by a corresponding design of an injection mold if the carrier element is produced as an injection molded part.

Furthermore, it can preferably be provided that a region of the enlarged diameter on the strain relief arrangement is designed as a circular flange, the diameter of which is larger than the greatest radial extent of the opening of the carrier element, and that the circular flange has a latching pin which faces the surface of the carrier element and is latchable into at least one depression in the surface of the carrier element. This enlarged diameter, which is designed as a circular flange, therefore completely covers the opening in the carrier element and makes it possible to latch the strain relief arrangement to the carrier element in a simple manner since the latching pin can be produced preferably integrally with the carrier element.

A hexagon can be formed on the side, which faces the threaded pin with the latching tongues, of the enlarged diameter, which is designed as a circular flange, in order to provide a handle for a wrench if the strain relief arrangement is intended to be inserted into the opening of the carrier element and rotated until the latching pin latches with a corresponding latching bore in the carrier element.

The thickness of a carrier element made from sheet metal can be, for example, 1 mm while a carrier element which is designed as a plastics injection molded part can have a thickness of 3 mm in the region of the opening. In order to be able to connect a strain relief arrangement according to the invention to carrier elements of different thickness, two circumferential grooves following each other with respect to the circumference can be formed in each radially enlarged region of the extension, of which circumferential grooves the first circumferential groove has the axial width corresponding to a smaller thickness of a first carrier element and the second circumferential groove has an axial width corresponding to a greater thickness of another carrier element.

In order to facilitate the introduction and rotation of the strain relief arrangement in the opening of the carrier element, a run-on slope can be formed at in each case one end of the circumferential grooves.

In detail, it can be provided that the base or bottom of the circumferential grooves runs from the opposite flattened portions as circular arcs toward the opposite circular portions, and that tangents extend adjoining the circular arcs toward the circular portions, the tangents acting as a rotary stop in the state of the strain relief arrangement in which the latter is inserted, rotated and latched in the opening of the carrier element.

The plug coupling can be designed in such a manner that the extension to be introduced into the opening of the carrier element has a widened receptacle for a plug contact connected to the connecting cable.

A depression designed as a bore can be arranged adjacent to the circumference of the opening in the carrier element, the depression serving for the latching of the strain relief arrangement to a carrier element of smaller thickness and for the latching of the strain relief arrangement to a carrier element of greater thickness by means of the latching pin in different positions.

The object mentioned at the beginning is furthermore achieved by an operating unit for an electronically controlled air suspension system which is electrically connected releasably to the electronically controlled air suspension system via a strain relief arrangement coupled to a connecting cable, as defined above.

Furthermore, the object indicated above is achieved by the use of a strain relief arrangement as defined above which serves for the releasable coupling of an operating unit to an electronically controlled air suspension system by means of a connecting cable.

Such an electronically controlled air suspension system and the operating unit required therefor are known in general.

BRIEF DESCRIPTION OF THE DRAWINGS

The invention will be explained in more detail below with reference to an exemplary embodiment which is illustrated in the attached drawings. In the drawings.

DETAILED DESCRIPTION OF THE DRAWINGS

Figure 1:
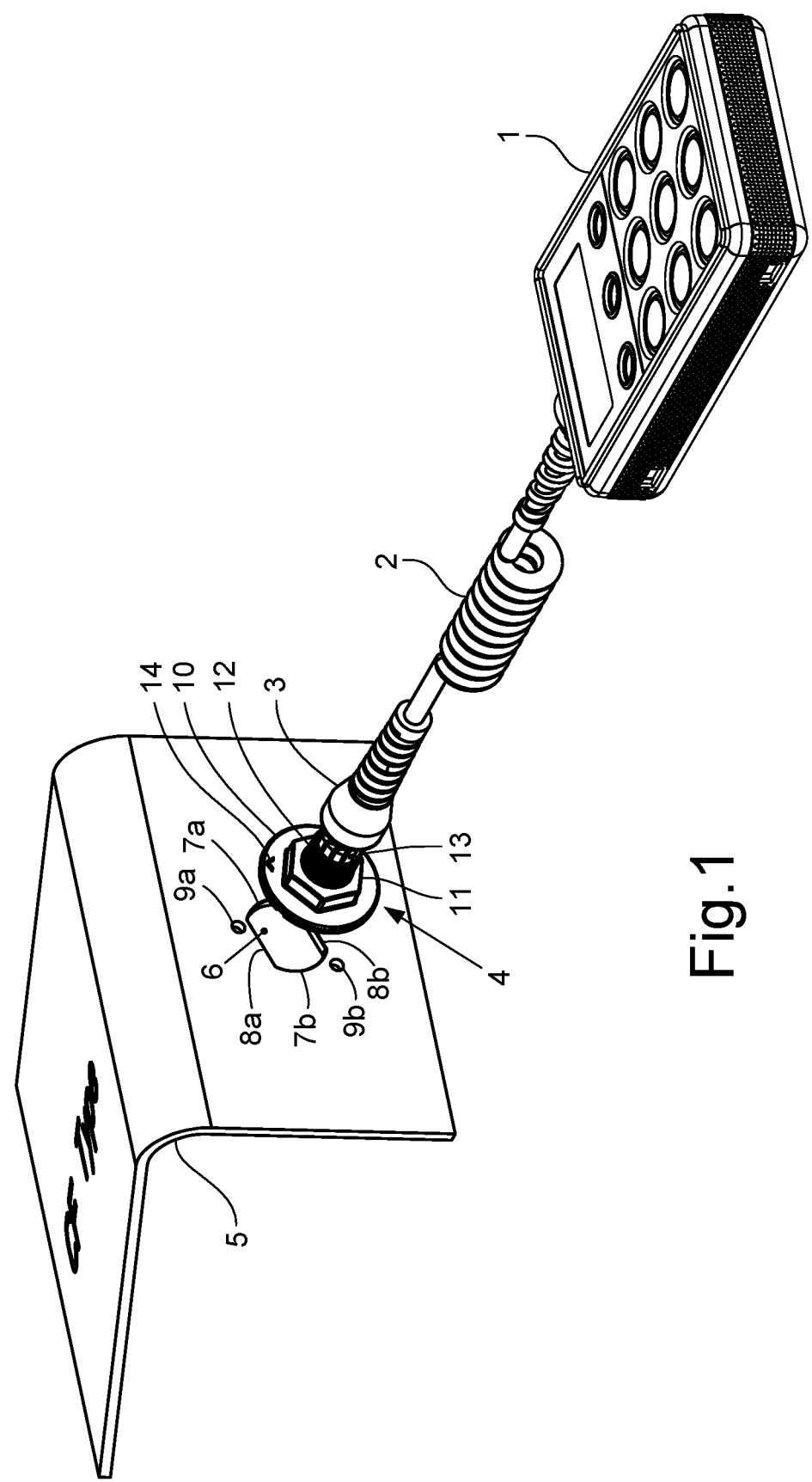
FIG. 1 shows a perspective illustration of a strain relief arrangement connected via a connecting cable to an operating unit, specifically before the strain relief arrangement is coupled to a carrier element.
Figure 2:
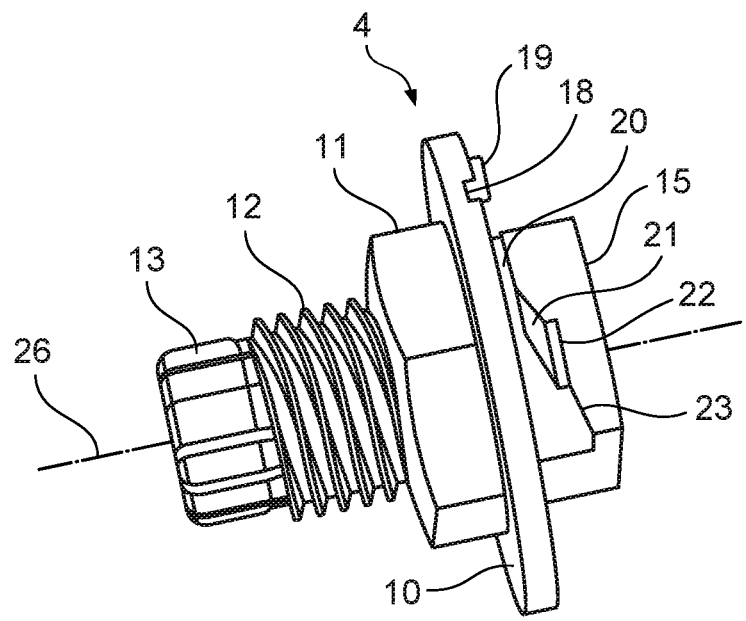
FIG. 2 shows a perspective side view of the strain relief arrangement according to FIG. 1 with an illustration of grooves on same for fastening to carrier elements of different thickness.
Figure 3:
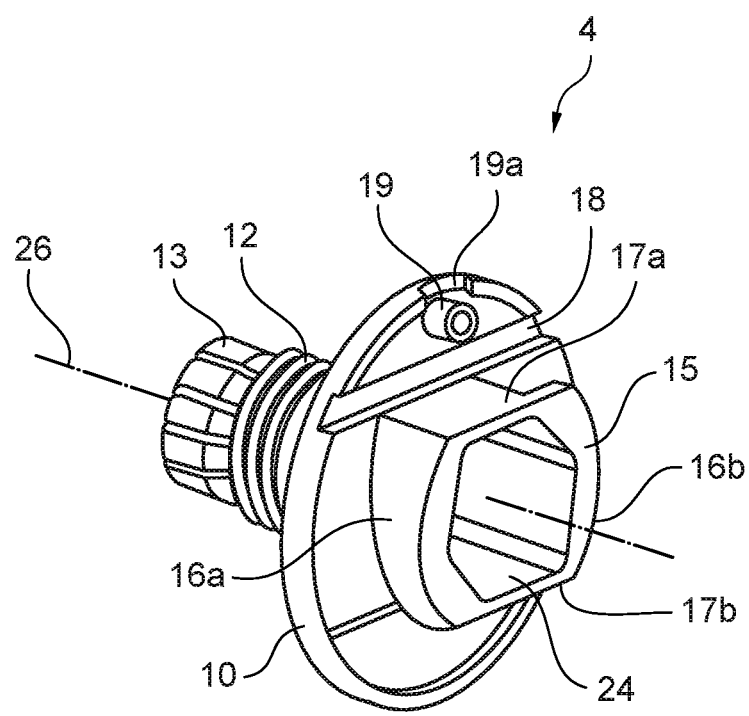
FIG. 3 shows a perspective illustration of the strain relief arrangement according to FIG. 2 from a different viewing direction.
Figure 4:
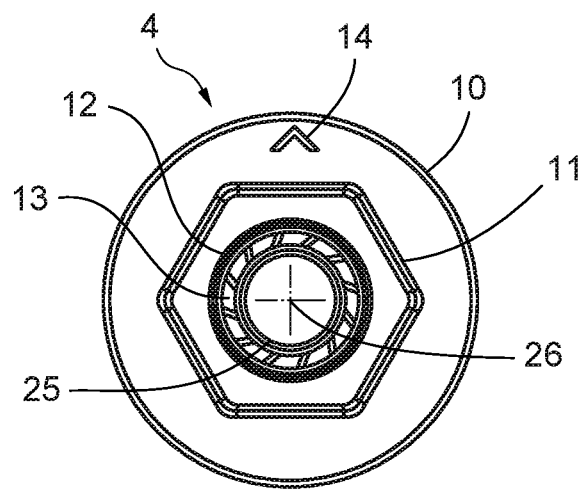
FIG. 4 shows a top view on the operating-device side of the strain relief arrangement according to FIGS. 2 and 3.
Figure 5:
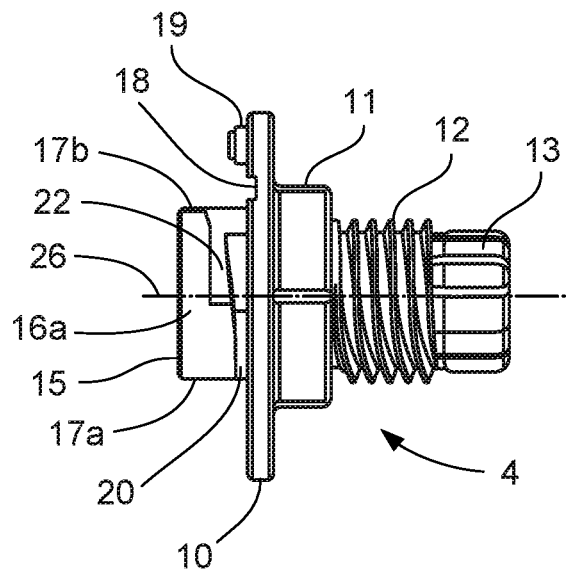
FIG. 5 shows a second side view of the strain relief arrangement according to FIGS. 2 and 3.

FIG. 1 accordingly shows an operating unit 1 for an electronically controlled air suspension system, which operating unit is connected via a connecting cable 2 to a strain relief arrangement 4. Said strain relief arrangement 4 is configured to be fastened to a carrier element 5. In the exemplary embodiment illustrated, the carrier element 5 is designed as an angle bracket with a wall thickness of 1 mm. An opening 6 designed as an elongated hole consisting of two opposite circular portions 7a, 7b and two parallel straight lines 8a, 8b connecting the latter is formed in a first limb of the carrier element 5. Two diametrically opposite latching bores 9a, 9b, the function of which will be described later, are illustrated in the vicinity of the circumference of the opening 6.

The strain relief arrangement 4 has an enlarged diameter in the form of a circular flange 10 and an adjoining hexagon 11 for the engagement of a wrench. Extending coaxially from the hexagon 11 is a threaded pin 12, at the free end of which a plurality of elastic clamping tongues 13 are arranged in a circular manner. On that side of the flange 10 which faces the opening 6 in the carrier element 5, an extension 15 extends in the direction of the opening 6 of the carrier element 5 with two opposite, radially enlarged regions in the form of cylindrical circular portion surfaces 16a, 16b, the center point of which lies on a longitudinal axis 26 of a bore 25 for the passage of the connecting cable 2 through the strain relief arrangement 4. The cylindrical circular portion surfaces 16a, 16b are connected by radially opposite, rectilinear and parallel flattened portions 17a, 17b which produce a radially smaller region of the extension 15. Parallel to one of the opposite flattened portions 17a, 17b, a narrow transverse groove 18 runs through the flange 10 which radially inwardly delimits a flexurally soft portion of the flange 10 in which a latching pin 19 is arranged. A cutout 19a formed in the vicinity of the latching pin 19 on the flange 10 serves for the fitting of a screwdriver or similar tool, as will also be explained later.

Adjacent to the surface facing the opening 6 in the carrier element 5, the axial extension 15 has a narrow circumferential groove 20, the width of which corresponds to the thickness of the bent-over first limb of the carrier element 5, for example 1 mm, if the carrier element 5 is composed, for example, of a metal sheet. From the narrow circumferential groove 20, a first run-on slope 21 merges into a wider circumferential groove 22, the width of which can be, for example, 3 mm and corresponds to the thickness of a carrier element 5 made from injection molded plastic. The wider circumferential groove 22 ends in a second run-on slope 23.

Figure 6:
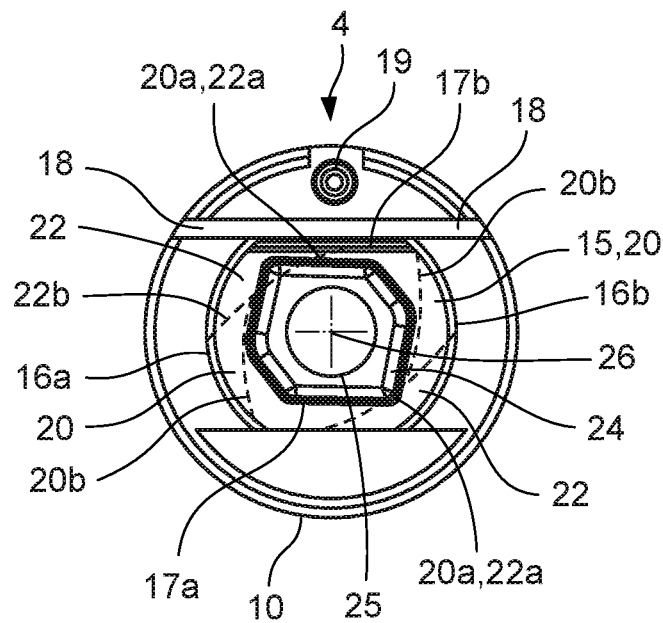
FIG. 6 shows a rear view of the strain relief arrangement according to FIGS. 2 and 3.

It is apparent from FIG. 6 that the narrow circumferential groove 20 extends over a circular portion 20a of 90°, which is adjoined by a tangent 20b which peters out vertically to the flattened portions 17a, 17b. The wider circumferential groove 22 likewise consists of a circular portion 22a which starts from the flattened portions 17a, 17b and is adjoined at an angle of 45° by a tangent 22b which peters out on the cylindrical circular portion surfaces 16a, 16b.

In the region of the extension 15, the passage bore 25 ends in a polygonal receptacle 24 for a plug coupling (not illustrated) which is connected to the connecting cable 2.

For the installation of the strain relief arrangement 4, a union nut 3 is first of all pushed onto the connecting cable 2, and subsequently the free end of the connecting cable 2 is pushed through the passage bore 25. Subsequently, a plug coupling (not illustrated) is connected to the conductors, which are free on the end side, of the connecting cable 2, then the connecting cable 2 is pulled back with the plug coupling until the plug coupling is positioned and fixed in the polygonal receptacle 24 in the extension 15. The union nut 3 is subsequently pushed beyond the clamping tongues 13 and screwed to the threaded pin 12. On the side facing the operating unit 1, the union nut 3 has an internal cone which radially compresses the clamping tongues 13 as the union nut 3 is being tightened onto the threaded pin 12 and, in the process, connects the connecting cable 2 in a tension-proof manner to the strain relief arrangement 4, and therefore tensile forces exerted on the connecting cable 2 cannot be passed on to the plug coupling located in the receptacle 24.

Since the shape of the inner extension 15 and the opening 6 in the carrier element 5 are formed in a geometrically complementary manner with respect to each other, the extension 15 can be introduced into the opening 6 and then rotated with the aid of a wrench which can be fitted on the hexagon 11, and therefore the narrower regions of the opening 6, which regions lie away from the parallel straight lines 8, either engage in the narrow circumferential groove 20, if the carrier element 5 is composed of a thin angle bracket with a wall thickness of 1 mm, or engage in the wider circumferential groove 22, if the carrier element 5 is composed of a plastics injection molded part with a thicker wall thickness of 3 mm. The rotation of the strain relief arrangement 4 in the opening 6 is limited by the tangents 20b on the circumferential groove 20 or by the tangents 22b on the circumferential groove 22, and, in this position, the latching pin 19 latches into one of the two diametrically opposite latching bores 9a, 9b. By this means, the strain relief arrangement 4 is fixed to the carrier element 5. Subsequently, the plug coupling (not illustrated) can be connected to a plug (not illustrated) of the electronically controlled air suspension system by means of the strain relief arrangement 4 which is connected to the plug via a cable (not illustrated).

In order to be able to couple the strain relief arrangement 4 to the carrier element 5, all that is therefore required is to attach and to latch the strain relief arrangement 4 from the front side of the carrier element 5. The strain relief arrangement 4 is released from the carrier element 5 in a similarly simple manner by the latching pin 19 being lifted out of the latching bore 9 by means of a screwdriver or a similar tool which is introduced into the cutout 19a on the flange 10, and subsequently the strain relief arrangement 4 being rotated in an opposite direction to the rotation for the fastening of the strain relief arrangement 4 in the carrier element 5 until the strain relief arrangement 4 can be pulled out of the opening 6.

In order to find the position of the latching pin 19, a marking 14 is provided on the flange 10. The strain relief arrangement 4 is preferably designed as a plastics injection molded part and can preferably be composed of a glass-fiber-reinforced polyimide.

While the above description constitutes the preferred embodiments of the present invention, it will be appreciated that the invention is susceptible to modification, variation and change without departing from the proper scope and fair meaning of the accompanying claims.

What is claimed is:

1. A strain relief arrangement (4) for a connecting cable (2), comprising:
   a threaded pin (12), having clamping tongues (13) at a free end of the threaded pin (12), an enlarged diameter (10, 11) on the threaded pin (12) for bearing against a surface of a carrier element (5), and an extension (15) for introducing and fastening the threaded pin in an opening (6) of the carrier element (5), and
   a union nut (3) for screwing onto the threaded pin (12), wherein the strain relief arrangement (4) has a passage bore (25) for the passage of the connecting cable (2), wherein, by screwing of the union nut (3) onto the threaded pin (12), the clamping tongues (13) are caused to move radially inward and are pressed against an outer circumference of the connecting cable (2) in order to bring about the strain relief of the connecting cable (2),
   wherein the extension (15) is of non-round or polygonal design with a radially larger region (16) and a radially smaller region (17), wherein the opening (6) of the carrier element (5) is geometrically complementary (7, 8) to the non-round or polygonal extension (15), wherein the radially larger region (16) of the non-round or polygonal extension (15) includes a circumferential groove (20) adjacent to the enlarged diameter (10, 11) and extending over a partial circumference of the polygonal extension (15), wherein an axial width of the circumferential groove (20) corresponds to a thickness of the carrier element (5) at the opening (6), and wherein a radial depth of the circumferential groove (20) corresponds to a radial dimension of the at least one radially smaller region (17) of the extension (15) in such a manner that the extension (15) is sized to be introduced into the complementary opening (6) of the carrier element (5) and to be fastened to the carrier element (5) by rotation in the complementary opening (6),
   wherein a region (10) of the enlarged diameter (10, 11) on the strain relief arrangement (4) is shaped as a circular flange (10), the diameter of which is larger than the greatest radial extent of the opening (6) of the carrier element (5), and wherein the circular flange (10) has a latching pin (19) facing the surface of the carrier element (5) and is latchable into at least one depression (9) in the surface of the carrier element (5).

2. The strain relief arrangement as claimed in claim 1, wherein the radially larger region (16) of the extension (15) consists of two radially opposite circular portions (16) with the common center point on the longitudinal axis (26) of the bore (25) for the connecting cable (2), wherein the radially smaller region (17) of the extension (15) consists of parallel, radially opposite flattened portions (17), and wherein a respective circumferential groove (20) is formed in each radially larger region (16).

3. The strain relief arrangement as claimed in claim 1, wherein the extension (15) to be introduced into the opening (6) of the carrier element (5) has a widened receptacle (24) for a plug contact connected to the connecting cable (2).

4. The strain relief arrangement as claimed in claim 1, wherein a depression (6) designed as a latching bore is arranged adjacent to the circumference of the opening (6) in the carrier element (5), said depression serving for the latching of the strain relief arrangement (4) to a carrier element (5) of smaller thickness and for the latching of the strain relief arrangement (4) to a carrier element (5) of greater thickness by means of the latching pin (19) in different positions.

5. A system comprising and operating unit (1), an electronically controlled air suspension system, and a strain relief arrangement (4) as claimed in claim 1, wherein the operating unit is electrically connected releasably to the electronically controlled air suspension system via the strain relief arrangement (4) and the strain relief arrangement is coupled to a connecting cable (2).

6. A strain relief arrangement (4) for a connecting cable (2), comprising:
   a threaded pin (12), having clamping tongues (13) at a free end of the threaded pin (12), an enlarged diameter (10, 11) on the threaded pin (12) for bearing against a surface of a carrier element (5), and an extension (15) for introducing and fastening the threaded pin in an opening (6) of the carrier element (5), and
   a union nut (3) for screwing onto the threaded pin (12), wherein the strain relief arrangement (4) has a passage bore (25) for the passage of the connecting cable (2), wherein, by screwing of the union nut (3) onto the threaded pin (12), the clamping tongues (13) are caused to move radially inward and are pressed against an outer circumference of the connecting cable (2) in order to bring about the strain relief of the connecting cable (2), wherein the extension (15) is of non-round or polygonal design with a radially larger region (16) and a radially smaller region (17), wherein the opening (6) of the carrier element (5) is geometrically complementary (7, 8) to the non-round or polygonal extension (15), wherein the radially larger region (16) of the non-round or polygonal extension (15) includes a circumferential groove (20) adjacent to the enlarged diameter (10, 11) and extending over a partial circumference of the polygonal extension (15), wherein an axial width of the circumferential groove (20) corresponds to a thickness of the carrier element (5) at the opening (6), and wherein a radial depth of the circumferential groove (20) corresponds to a radial dimension of the at least one radially smaller region (17) of the extension (15) in such a manner that the extension (15) is sized to be introduced into the complementary opening (6) of the carrier element (5) and to be fastened to the carrier element (5) by rotation in the complementary opening (6), wherein the circumferential groove is a first circumferential groove, further comprising a second circumferential groove (22), the first and second circumferential grooves following each other in the circumferential direction and formed in two opposed radially larger regions (16) of the extension (15), wherein the first circumferential groove (20) has an axial width corresponding to a smaller thickness of a first carrier element (5), and wherein the second circumferential groove (22) has an axial width corresponding to a greater thickness of another carrier element (5).

7. The strain relief arrangement as claimed in claim 6, wherein a respective run-on slope (21, 23) is formed at one end of each of the first and second circumferential grooves (20, 22).

8. The strain relief arrangement as claimed in claim 6, wherein a base of the first and second circumferential grooves (20, 22) runs from the opposite flattened portions as circular arcs (20a, 22a) toward adjoining circular portions, and wherein tangents (20b, 22b) extend adjoining the circular arcs toward the circular portions, the tangents acting as a rotary stop in a state, in which the strain relief arrangement (4) is inserted, rotated and latched in the opening (6) of the carrier element (5).

9. The strain relief arrangement as claimed in claim 6, wherein the radially larger region (16) of the extension (15) consists of two radially opposite circular portions (16) with the common center point on the longitudinal axis (26) of the bore (25) for the connecting cable (2), wherein the radially smaller region (17) of the extension (15) consists of parallel, radially opposite flattened portions (17), and wherein a respective circumferential groove (20) is formed in each radially larger region (16).

10. The strain relief arrangement as claimed in claim 6, wherein the extension (15) to be introduced into the opening (6) of the carrier element (5) has a widened receptacle (24) for a plug contact connected to the connecting cable (2).

11. A system comprising and operating unit (1), an electronically controlled air suspension system, and a strain relief arrangement (4) as claimed in claim 6, wherein the operating unit is electrically connected releasably to the electronically controlled air suspension system via the strain relief arrangement (4) and the strain relief arrangement is coupled to a connecting cable (2).

* * * * *